United States Patent [19]

Cross

[11] Patent Number: 4,864,288
[45] Date of Patent: Sep. 5, 1989

[54] HALL EFFECT MOTION DETECTOR RESPONSIVE TO DUAL FREQUENCY STIMULI

[75] Inventor: Donald R. Cross, Torrance, Calif.

[73] Assignee: Iwata Electric Co., Ltd., Tokyo, Japan

[21] Appl. No.: 134,965

[22] Filed: Dec. 18, 1987

[51] Int. Cl.$^4$ ............................................. G08B 13/22
[52] U.S. Cl. .................................. 340/669; 307/117; 340/566; 340/183; 340/429
[58] Field of Search ................ 340/65, 669, 566, 683, 340/540; 307/117

[56] References Cited

U.S. PATENT DOCUMENTS

| | | | |
|---|---|---|---|
| 3,559,050 | 1/1971 | Mifsud | 367/905 |
| 4,496,809 | 1/1985 | Faust et al. | 200/61.45 R |
| 4,628,735 | 12/1986 | Kirkpatrick | 73/517 AV |
| 4,749,056 | 6/1988 | Iwata | 340/65 |

OTHER PUBLICATIONS

Streetman, Ben G., Solid State Electronic Devices, pp. 88-90, Prentice-Hall, Englewood Cliffs, N.J., 1980.

Primary Examiner—Glen R. Swann, III
Attorney, Agent, or Firm—John E. Wagner

[57] ABSTRACT

A Hall-effect device and a magnet are mounted on respective resonant bridge supports in magnetic field relationship whereby movement of either the magnet or the Hall-effect device produces a change in the field strength at the Hall-effect device. The two support structures with their mounted components exhibit different natural resonant frequencies whereby stimuli in either of two different ranges causes one or both of the magnet or Hall-effect device to move at their resonant frequency producing a signal. Signal processing circuitry disregards D.C. signals from the Hall-effect device and responds only to A.C. signals, indicative of shocks in the 1000 to 2000 Hertz range or movement of the detector with components in less than the 150 Hertz range. Three different bridge structures are disclosed, one with separate bridges, one employing common support columns and one which is integrally molded.

32 Claims, 5 Drawing Sheets

HALL EFFECT MOTION DETECTOR RESPONSIVE TO DUAL FREQUENCY STIMULI

TECHNICAL FIELD

This invention relates to an improved, combined motion and shock sensor and an improved signal processor for the sensor usable for applications in the security and protection of mobile and/or stationary enclosures such as vehicles, vessels, trailers, aircraft, and the like, as well as a vibration monitor in numerous industrial applications.

BACKGROUND OF THE INVENTION

In the past many attempts have been made to achieve a truly reliable, interference-immune, compact and effective motion detector for use in protecting vehicles or other structures from unauthorized entry and theft. Many systems have been devised which are sensitive to movement of a vehicle or a person in the region of the protected structure. These, however, have usually exhibited high susceptibility to false alarms due to normal stimuli such as passing traffic, thunder, electrical fields and other natural causes too numerous to mention. Other motion detectors do not respond to shock input in addition to being susceptable to false alarms.

In vehicle alarm systems, attempts have been made to devise a system which responds to stimuli at two different frequencies. An example of such a system is disclosed in U.S. Pat. No. 4,496,809 to J. H. Faust et al. Such a system employs cantilevered springs. Other forms of dual response motion detectors are typified by the system of U.S. Pat. No. 3,559,050 to J. F. Mifsud which employs a pair of separate windings on a single coil form and coupled through an electrical circuit for amplification and phase adjustment. The net result is operation as an accelerometer and as low frequency geophone. Other accelerometers employing a vibrating beam are illustrated in U.S. Pat. No. 4,628,735 to Gordon S. Kirkpatrick which includes a dual beam force sensing element.

Piezoelectric sensors are commonly employed in accelerometers. They exhibit stability however, being of ceramic construction, are often brittle and subject to shock damage.

Hall-effect devices such as those described in SOLID STATE ELECTRONIC DEVICES, B. G. Streetman, Copyright 1980, Prentice-Hall, Inc., Englewood Cliffs, N.J. 07632, at pages 88–90, exhibit a sensitivity to changes in ambient magnetic field. This property makes them useful in applications where a controllable magnetic field may be produced in order to provide an electrical signal from a solid state device. The use of Hall-effect devices in motion detectors to detect dual frequency stimuli has not been heretofore achieved in a useful device.

SUMMARY OF THE INVENTION

This invention has, as its object, to provide an improved device for sensing the various motions and shocks generated by unauthorized and/or unlawful attempts to enter, move, damage and/or otherwise interfere with the enclosure in which it has been installed or to which it has been attached, either permanently or temporarily.

Another object is to increase the angular displacement from its normal horizontal position, over which the sensor can be used without any appreciable loss or degradation of sensitivity, such that when the sensor is mounted in a mobile enclosure such as an automobile, truck or trailer, the enclosure can be left in any reasonable position on an up or down-grade without the grade angle affecting the operation of the sensor.

Another object is to improve the sensor's differentiation between those motions and shocks which accompany unwarranted entry attempt and those motions and shocks which randomly occur due to outside forces such as casual contact with the protected enclosure; seismic vibrations from passing vehicles; strong winds; rapid temperature variations; naturally-occurring noise such as thunder: man-made noise such as a siren or horn; and other external forces that create false detections in prior devices.

Another object is to provide a high degree of sensor immunity from electromagnetic interference generated either by forces external to the protected enclosure such as lightning, high-tension power lines and radio frequency emitting devices, or forces internal to the protected enclosure such as computers, vehicle ignition systems, and the like. These create false detections in prior devices. The above identified objects are intended to lead to the universal applicability of the invention to the field of security sensor devices.

The invention meets these and other objectives and advantages through the use of unique structure and design in both the sensor's mechanical arrangements and in its electronic sensing and signal processing circuits. As designed, the invention consists of a permanent magnet attached to and suspended from a resilient support such as a bridge formed from an elastomeric compound and symmetrically balanced between two end supports. The bridge serves to properly position the magnet at a precise distance from and centrally located in relation to a Hall-effect device. That device is the input sensor for the electronic circuitry to follow. The Hall-effect device is similarly mounted on a resilient support such as a thin metal suspension bridge symmetrically balanced between two end supports.

The free motion of the magnet in relation to the Hall-effect device is controlled to a large extent by the physical properties of the elastomeric suspension system such as its length between supporting structures, durometer of its material, its dimensions, the tension impressed upon the elastomer as it is mounted, and the size and weight of the magnet mounted therein.

The Hall-effect device is also free to move independently in relation to the magnet. Its motion is again controlled by the physical properties of its suspension system such as the dimensions of the metal bridge, the material from which the bridge is constructed, and the tension or compression impressed upon it as it is mounted. These properties therefore also tend to effect the response of the invention to outside forces and are therefore an intrinsic part of the design of the invention.

In the preferred embodiment of the invention, the magnet's suspension system is made to be resonant in the approximate range of 20 to 30 Hertz, while the Hall-effect device's suspension system is made to be resonant in the approximate range of 1,700 to 1,800 Hertz. The resonant frequency and range of either or both suspensions can be adjusted for the requirements of the particular application, as long as the rigidity of the two suspension systems is not made so low as to adversely affect the design separation between the magnet and the Hall-effect device while the sensor is at rest in a normal gravitational field. This separation is critical to the invention's ability to maintain a stable and unchanging sensitivity to motion when it is placed in a position other than the normal horizontal.

The selective resonance capability of the invention also makes it an ideal device for the monitoring of any number of motions and vibrations that might conceivably have an effect on any structure, object or other entity. Multiple units, each with different resonances designed into their suspension systems, can be used in any one application. One use of the properties of this invention might be monitoring the effects of passing traffic on sensitive scientific equipment such that when vibrations in a range that is deleterious to the equipment are sensed, the equipment is automatically shut down. In another instance, the invention might be used to detect those vibrations in large rotating machinery that are the precursors of impending failure, thus allowing the machinery to be stopped and repaired before further damage can occur. In both of these examples, it is the capability of the invention to detect motion in a very precise and selective bandwidth or frequency that allows it to sense the dangerous motions and ignore the motions that are normal to the surroundings or in the operation of the device, enclosure or object to which the device is attached.

The motion and/or motions of either or both the magnet and the Hall-effect device are detected in the Hall-effect device by measuring the changes in the current of an associated bias voltage applied to the Hall-effect device in the normal manner. This is caused by the changing magnetic flux field that results from the positional change of the magnet and the Hall-effect device due to these motions. These changes are then amplified and processed by the following electronic circuitry to provide an output when the system senses motion, as well as to provide threshold control such that motions below a given level will not create an output from the device.

The use of the two resonant suspension systems is totally unique to this invention in this field. Additionally, the ability to tune each of the bridges to a specific range of resonance is unique and provides dual mechanical filtering that can be precisely controlled, while not having the susceptibility to external electromotive and thermal forces that created false activation in earlier sensor designs using active electronic filtering. The design also reduces electrical current consumption by reducing component count in the signal processing circuits. Finally, the use of a Hall-effect device reduces the sensitivity degradation that occurs when sensor devices that use inductive pickups are exposed to stray electromagnetic fields for which the latter are natural receptors. The flux density of the invention's magnet is so numerically superior, being in the range of several tens of Gauss, that even buried or overhead high energy, electrical distribution systems and wireless transmitters producing something in the area of $10^{-5}$ Gauss cannot interfere with this invention's operation.

BRIEF DESCRIPTION OF THE DRAWINGS

This invention may be more clearly understood by the following detailed description and by reference to the drawings in which.

DESCRIPTION OF A PREFERRED EMBODIMENT

Figure 1:
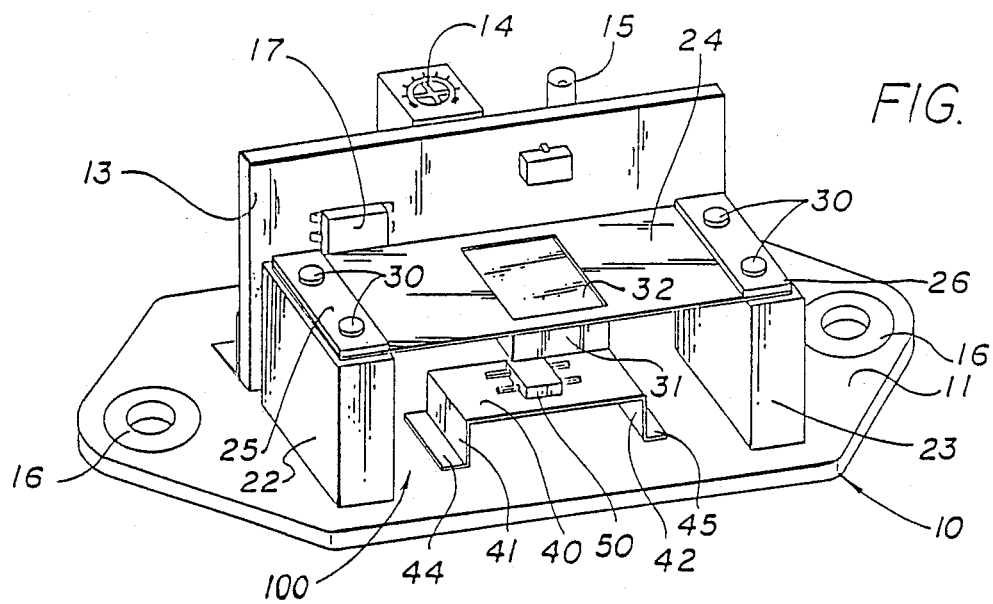
FIG. 1 is a perspective view essentially showing the embodiment of the invention, with its top cover removed, as a sensor designed to detect motion and shock to a vehicle.
Figure 2:
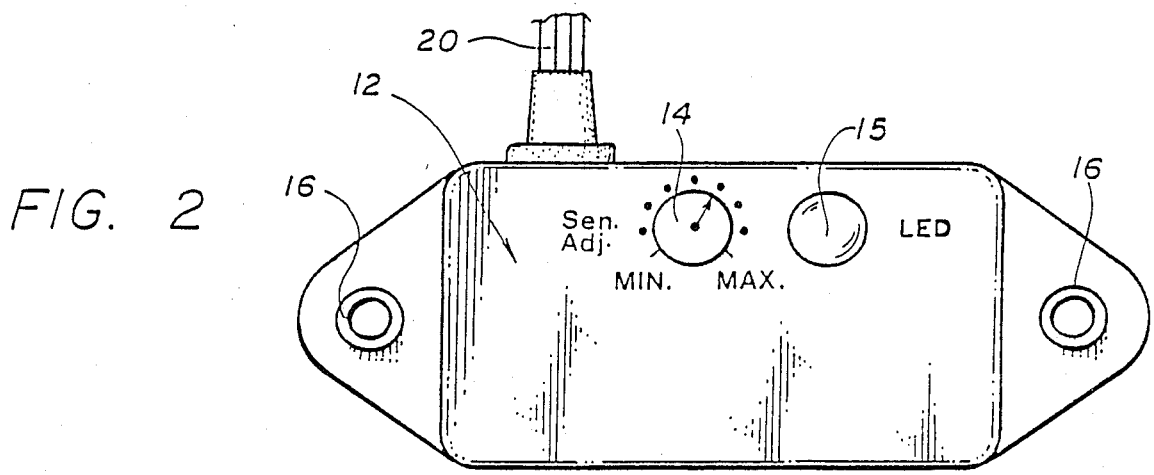
FIG. 2 is a top plan view of the sensor of FIG. 1 in its housing.
Figure 3:
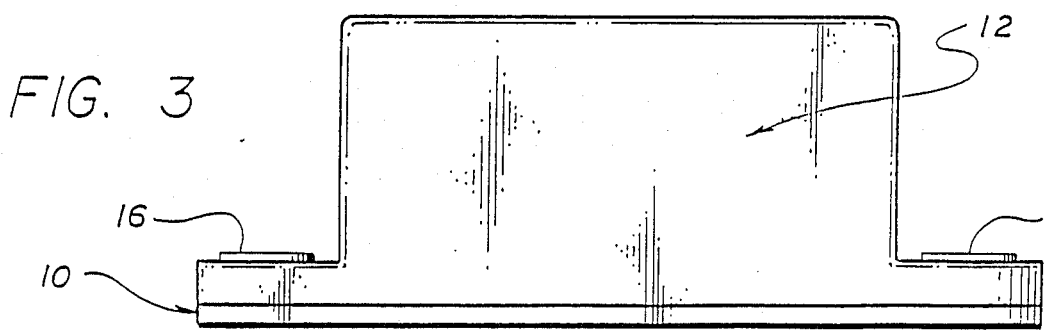
FIG. 3 is a side elevational view thereof.
Figure 4:
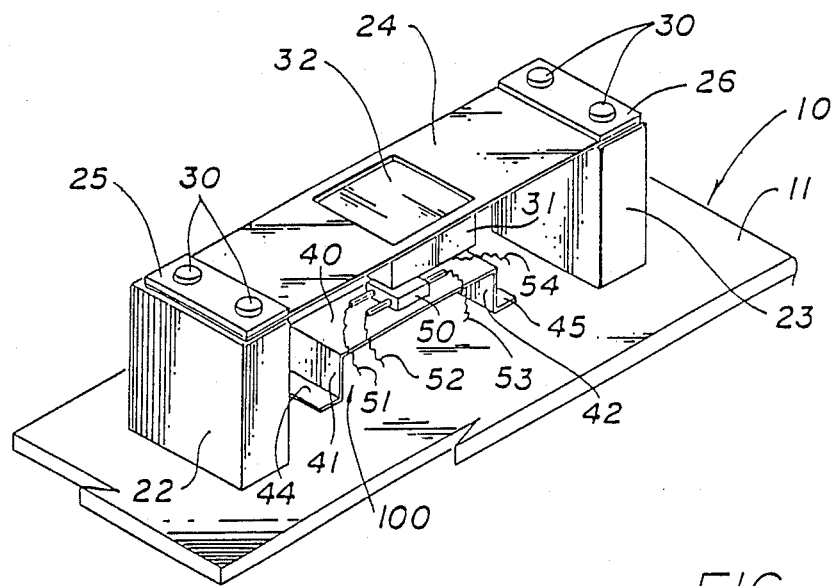
FIG. 4 is a simplified perspective view of the bridge assembly of FIG. 1.
Figure 5:
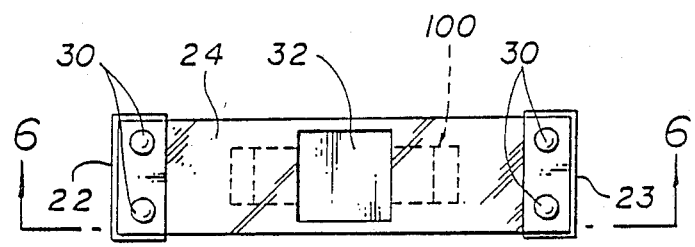
FIG. 5 is a top plan view of the bridge assembly of FIG. 4.
Figure 6:
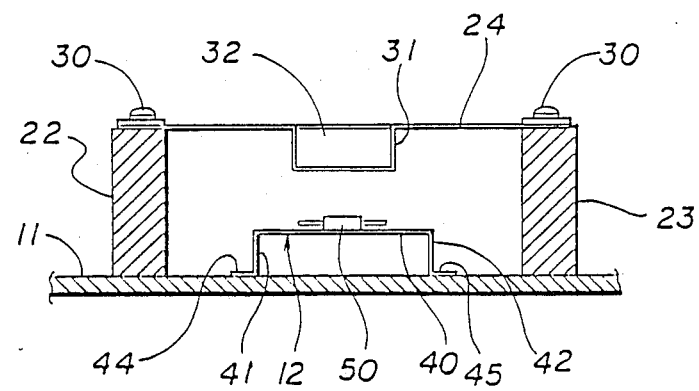
FIG. 6 is a vertical sectional view taken along line 6—6 of FIG. 5.

The system as shown in FIGS. 1 through 6 of the drawing is generally designated as 10. It includes a base plate 11, a housing 12 of FIG. 3, a sensor assembly generally designated 100 in FIGS. 1 and 4 and its associated electronic circuits on circuit board 13. A sensitivity adjust potentiometer 14 and indicator Light Emitting Diode (LED) 15 are mounted on printed circuit board 13 and accessible through openings in the top of housing 12. Two hollow rivets 16 are used to hold the housing to the base plate 11. A lead wire 20 of FIG. 2 provides for the input of power to the system and the output of an alarm signal from the system. The configuration of this lead wire harness depends on the particular application of the device. In this instance, in FIGS. 1 through 3, the system is depicted as being intended for vehicular use. The vehicle battery furnishes power for this system and for an alarm, unshown, activated when this system is triggered. In FIGS. 4 through 6 the system is shown in generalized form. The system of FIGS. 1 through 3 includes its own LED visual indicator 15 to allow system check and calibration. It is envisioned that the major application of the system will be in supplying output to existing audio and/or visual alarms.

The preferred embodiment of the sensor structure is as shown in FIG. 1. The suspension system is formed by a pair of columns 22 and 23 and an elastomeric silicone bridge 24 exhibiting the desired properties of minimal physical change over the systems operating temperature range of between −40 and +80 degrees Celcius. After the exact shape and dimensions of the elastomeric bridge are determined, the bridge 24 is fastened at both ends to, and supported by, the flat tops of columns 22 and 23. Fastening of the elastomer to the posts is accomplished here by two plates 25 and 26, each held in place with two rivets 30. Other attachment methods could be used including, but not limited to, thermal bonding and adhesives. The elastomer bridge 24 may also be fastened directly to the interior walls of the system housing by a number of methods.

An magnetic field producing element such as a rectangular permanent magnet 32 is contained in a matching, rectangular shaped depression 31 formed in the center of the elastomer bridge 24 and extends below the upper surface of the elastomer. The shape of the permanent agent and its magnetic field density may be varied to suit the needs of a particular application.

Figure 9:
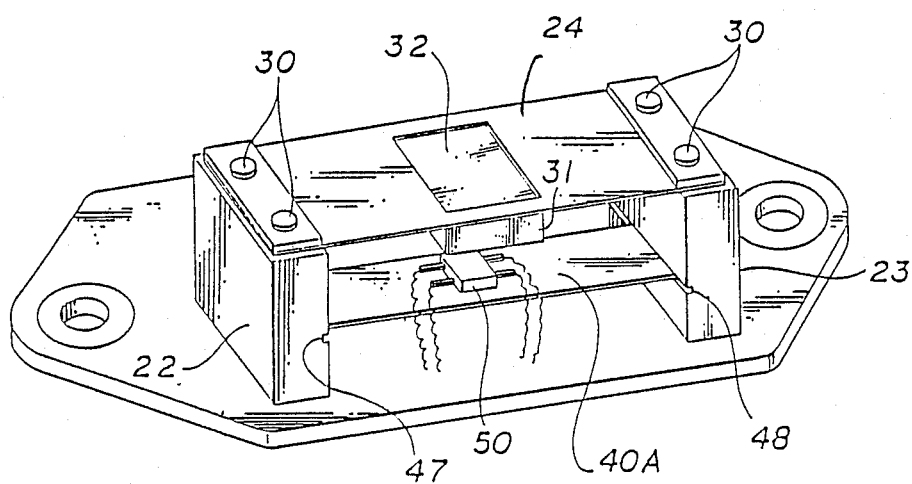
FIG. 9 is a side elevational view of a dual bridge assembly employing common bridge columns.

A second suspension system is comprised of a sheet of non-corrosive metal being formed into an angled channel such that it forms a bridge 40 supported at each end by integral legs 41 and 42 with foot portions 44 and 45 mounted on base plate 11. This suspension system can be fabricated in numerous ways, dependent on the economics of production, size of the finished device package, and on the sensor's application. It may take the form of a metal bridge fastened to two independent posts in a manner similar to that of the elastomeric bridge previously described. It may also be designed so that this metal bridge 40 fits into recesses in the same columns 22 and 23 which support the elastomeric bridge 24 as illustrated in FIG. 9 and discussed below.

The dimensions, shape and physical characteristics of the metal suspension bridge 40 and its leg supports 41 and 42 can be adjusted to fit the resonant range requirements of the application, bearing in mind the importance of being able to maintain relatively stable static spacing and position between the two suspension systems. Here, the metal suspension bridge 40 is held in place by fastening its integral legs 41 and 42 to the same base plate 11 as the elastomeric suspension system support columns 22 and 23. The feet 44 and 45 may be fastened to the base plate with rivets, screws, welding or adhesives and the housing 12 may be fastened with rivets, screws, welding, adhesives and the like.

A solid state magnetic field sensitive device such as a Hall-effect element 50 is attached to the center of the metal bridge 40 by an adhesive compound. The attaching wires 51 through 54 of FIG. 4 for the element 50 are carefully routed away from the field sensitive device and the suspension so as not to interfere with the natural resonance of the suspension. Wires 51 and 53 are used to supply the bias voltage to the element 50, while the wires 52 and 54 are used to extract the output signal.

The bridges 24 and 40 are symmetrically placed so that the magnet 32 and the Hall-effect device 50 are located in spaced juxtaposition to establish a relatively stable magnetic field at the Hall-effect device despite orientation of the sensor. The columns 22 and 23 supporting bridge 24 are relatively rigid so that the resonant characteristics of the magnetic field producing assembly are determined nearly exclusively by the flexible elastomer bridge 24 with its center loaded mass of the magnet 32. The bridge 40 with its integral legs 41 and 42 finds its resonant frequency determined by the bridge or span portion 40, it legs 41 and 42 and the center load of the Hall effect device 50.

Bias voltages, signal conditioning, and system output are controlled by the electronics packaged within the device on printed circuit board 13.

Figure 10:
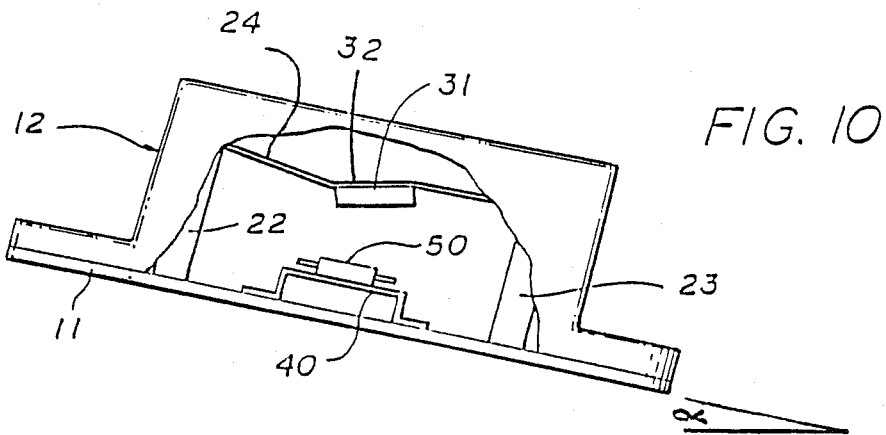
FIG. 10 is a side elevational view, partly broken away, of FIG. 1 showing in an inclined position illustrating the movement of the magnet.
Figure 11:
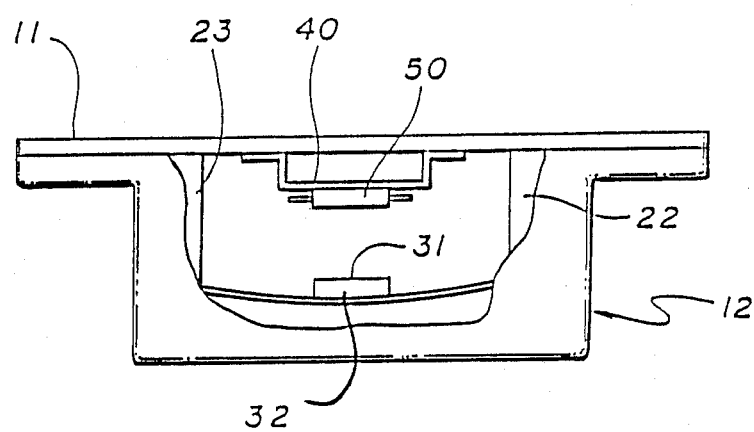
FIG. 11 is a side elevational view similar to FIG. 10 in inverted form.

This invention provides its dual range of sensitivities by reason of both the Hall-effect device 50 and the magnet 32 being individually suspended on vibration sensitive supports and in their operational relationship to each other. Two superimposed bridges provide this preferred relationship. The magnet 32 has the greater mass and therefore is suited for mounting on the lower frequency responding support. Being suspended directly above the Hall-effect device 50 on a flexible bridge 24, any twisting of the bridge 24 due to inclination of the sensor (by parking on an incline) only rotates the magnet slightly while maintaining its static spacing from the Hall-effect device as substantially uniform. This makes the sensor of this invention relatively position-insensitive. Inversion, however, substantially changes the spacing therefore mounting with the base plate downward is preferred. The effects of inclination or inversion of the sensor are illustrated in FIGS. 10 and 11 and described below in connection with those figures.

Figure 7:
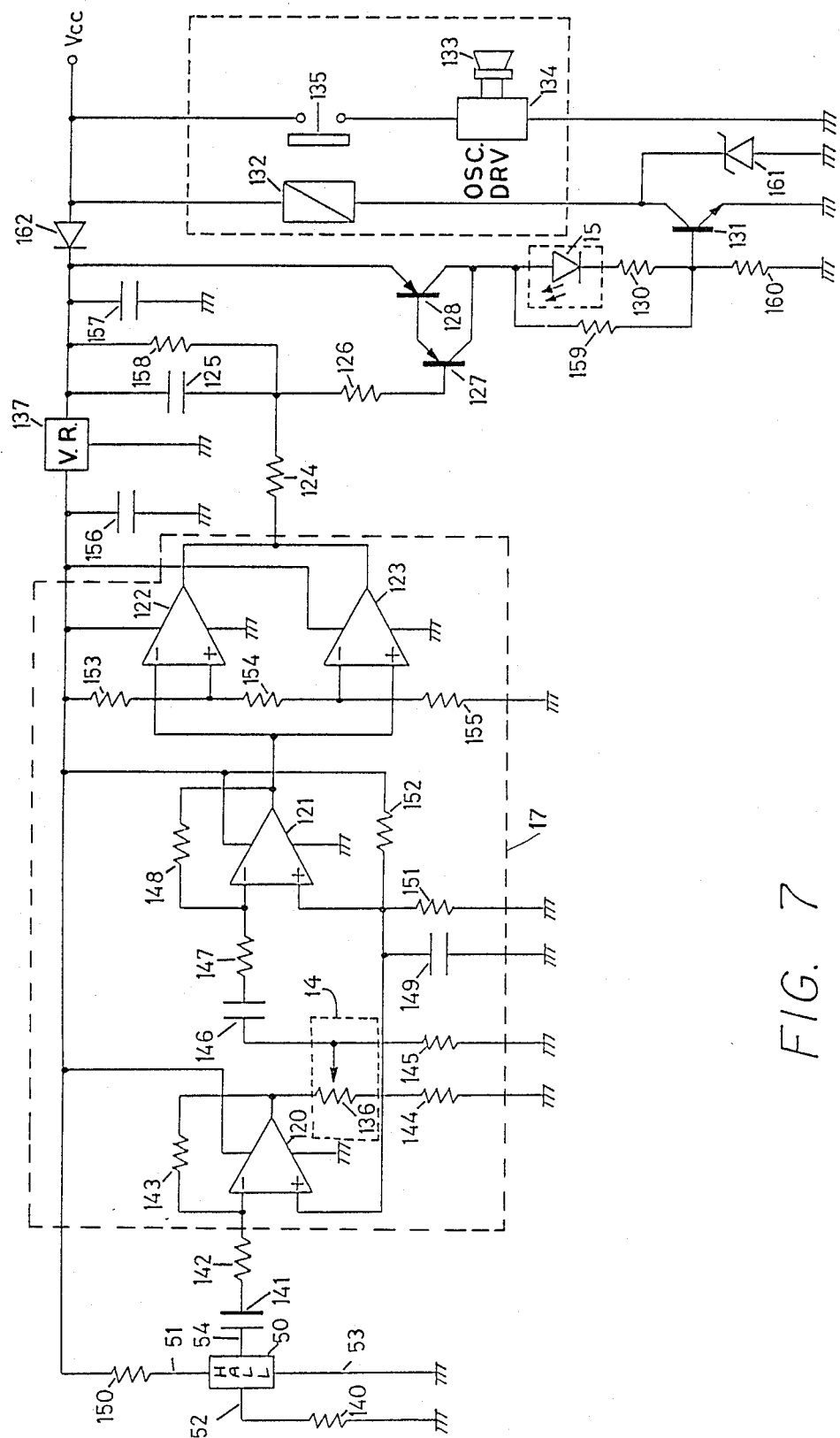
FIG. 7 is a circuit diagram of the electronics associated with the device of FIG. 1.

Behind the sensor assembly 100 in FIG. 1 is printed circuit board 13 carrying the circuitry of FIG. 7 including integrated circuit 17, potentiometer 14 providing sensitivity adjustment and LED 15. Access to the potentiometer is available through the top of housing 12 as illustrated in FIG. 2 and the LED 15 is visible through an opening in housing 12. Both the potentiometer 14 and LED 15 openings may be sealed with removable seals, unshown in the drawing since their use is only in calibration.

Calibration is accomplished by installing the sensor in the vehicle or protected space and applying voltage $V^{cc}$ to the similarly marked terminal of the circuit of FIG. 7 while grounding the similarly marked terminals of the circuit to the vehicle ground. The potentiometer 14 should be adjusted to a middle position and a simulated disturbance created, e.g. the scrape of a key along a glass panel for a high frequency test. Whenever the LED 15 illuminates, an alarm condition is detected. After a series of such tests in which the alarm condition occurs, the calibrating party should then engage in a normal legitimate movement such as the key entering the lock. If such an action produces an alarm condition as noted by illumination of the LED 15, the system sensitivity is to be reduced by rotating the potentiometer 14 to a less sensitive setting, but one which still responds to a simulated unauthorized intrusion.

Then the test is repeated with a low frequency simulation such as striking a bumper or lightly pounding on a door. In the case of a vehicle, one is simulating a normal bump by a third party vehicle parallel in the process of parking. The sensitivity adjust potentiometer 14 again is adjusted until it tolerates simulations of minor normal disturbances such as the parking bump, a passing truck or wind.

Next, the audible or other alarm may be connected to the output terminal. The sensor is then ready for use.

In use, the sensor system 10 is attached through mounting holes in hollow rivets 16 in its baseplate or by threaded inserts in its housing 12 to the enclosure to be protected. The system may be attached to the frame or metal of a vehicle in the trunk or under-hood area or the walls or floor of a trailer, as two possible examples. All motions and/or shocks impinging upon the mounting surfaces are transferred through the baseplate 11, housing 12, columns 22 and 23 and legs 41 and 42 to the two suspension bridges 24 and 40. If these motions and/or shocks are within the resonant range of either suspension system, their amplitude will tend to increase and be sustained by one or both of the suspensions. This, in turn moves either the magnet 32 or the Hall-effect device 50, or both, in relation to each other. This movement creates a variation in the flux density and direction as it flows from the magnet through and around the spacial area surrounding the Hall-effect element 50. Such changes in the magnetic field cause the electrical resistance of the Hall-effect element 50 to change in a known relationship to the amplitude and frequency of the original causative motion and/or shock, in turn creating a change in the current flow between the two bias wires 51 and 53 that can be detected across the two output wires 52 and 54.

Figure 8:
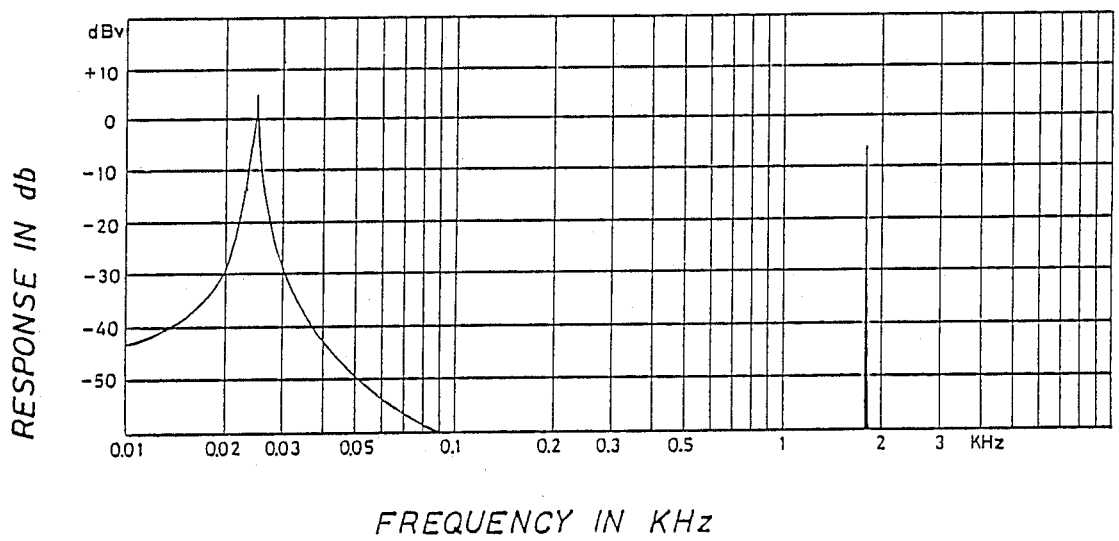
FIG. 8 is a graphical representation of typical response characteristics of this invention.

Because of the filtering accomplished by the mechanical resonance of the two suspension systems previously discussed, the voltage across the output wires 52 and 54 will not only be greater as the frequency of the causative motion and/or shock approaches the center resonance frequency of the two suspensions, but it will tend to decay over a longer period of time due to the commonly recoginzed physical characteristic of all vibrating objects known as sympathetic vibrations. This use of the bridge to produce the resonant structure eliminates the need for mechanical or electrical signal filters in the signal processing circuit box thereby reducing the complexity and cost and increasing the reliability of the invention. The output characteristics with two pronounced peaks is illustrated in FIG. 8. This output is applied to the circuit of FIG. 7 and will provide an output signal as an indication that an attempt has been made to forcibly interfere with the enclosure to which the sensor system is attached. In the example of a vehicle, this would occur when there was an attempt to break the vehicle's glass (producing a high frequency 1000–2000 Hz signal); raise the vehicle for the purposes of towing or wheel removal; force open its doors, hood, trunk or other external openings; and/or remove weighty goods from its interior (producing a low frequency, less than 150 Hz signal). The suspension systems for the Hall effect device and the magnet are tuned to these frequency ranges and particularly the magnet suspension system is tuned to the preferred range of 15 to 40 Hertz and the Hall-effect suspension system is tuned to the preferred range of 1750 to 1850 Hertz.

FIG. 7 defines the associated circuitry that is used for the preferred configuration shown herein. Operating voltage $V^{cc}$ is supplied from the protected vehicle or space and the bias voltage for the Hall-effect element 50 is developed by the voltage regulator 137 through the resistor 150. This is applied to the electromagnetic field responsive solid state Hall-effect element 50 via wires 51 and 53, wire 53 being the connection to a common system ground. The output signal from the Hall-effect element 50 caused by motion and/or shock within the resonant range as previously described appears on wires 53 and 54. Wire 52 is connected through load resistor 140 to ground, and wire 54 through a coupling capacitor 141 and resistor 142 to the input of an integrated circuit, operational A.C. amplifier 120, where feedback and bias is controlled by resistor 143. D.C. components or slow movement signals are blocked by capacitor 141. The output of this amplifier 120 is impressed across its load resistors 136 and 144. Since resistor 136 is of the variable type, any part of the signal voltage across it can be picked off for amplification in later stages of the circuitry. This allows the sensitivity of the sensor system to be set at the desired level. The preset level from voltage amplifier 120, coupled by capacitor 146 and resistor 147 is then amplified by a second operational amplifier 121 whose bias and feedback is controlled by resistor 148. Resistors 151, 152, and capacitor 146 control the overall feedback of amplifiers 120 and 121. The output from amplifier 121 is then sent equally to operational amplifiers 122 and 123, biased by resistors 153, 154 and 155. These two amplifiers are connected so as to work as a full wave rectifying detector. That is, amplifier 122 converts only signals more negative than a preset threshold into a negative polarity direct current and amplifier 123 converts only signals more positive than a preset threshold also into a negative polarity direct current. These two currents are summed through resistor 124 and serve to charge capacitor 125. When the charge on this capacitor 125 is sufficiently high, the amplifying transistor pair 127 and 128, biased by resistors 126 and 158, will switch on and supply a positive voltage to the following alarm circuitry enclosed in a dotted box. During the period when there is no signal from the Hall-effect element 50, resistor 158 discharges the voltage stored in capacitor 125. The action of capacitor 125 and resistors 124 and 158 also constitutes a time delay circuit that provides a predetermined alarm delay and alarm holding period. This prevents very brief motions and/or shocks from triggering an alarm, but still provides the proper output signal timing from the sensor system electronics to active any downstream alarms.

At this point, the positive voltage output from switching amplifiers 127 and 128 is applied to the anode of LED 129. While this LED is used here for indication of an alarm situation, it is also used in other versions of the sensor system as an indicator to assist in the setup of the system sensitivity. Current through the LED 129 is limited by the two resistors 130 and 160. At the junction of these two resistors, a small portion of the positive voltage is fed to transistor 131. As transistor 131 turns on, it creates a signal ground to relay 132 which is actuated to close its normally open contacts 135. Through these contacts a positive voltage is applied to the loud speaker 133 and oscillator/driver 134, outputting an audible alarm signal. A Zener diode 161 protects transistor 131 from damage by any reverse voltage produced through inductive kickback from the coil of relay 132, when the transistor 131 is turned off.

Diode 162, voltage regulator 137 and capacitors 156 and 157 provide the proper operating voltage and power supply filtering for the systems circuitry, as well as providing protection against reverse polarity power supply wiring.

The above circuitry also aids in the invention's capability to be in an orientation other than perfectly horizontal and still perform its role of motion and shock sensing without degradation of sensitivity. Since the first two amplifiers 120 and 121 are A.C. coupled, they are incapable of amplifying a D.C. voltage. Thus, even though the bias through the Hall-effect sensor may be changed by the angular displacement of the magnet when the invention is not in its normal horizontal position, as long as there is no vibration motion acceptable to either suspension system the resulting change in the output of the Hall-effect sensor will appear as a shifted D.C. voltage in the previously mentioned A.C. amplifiers. This shifted voltage will not be amplified and cannot pass on to the rest of the sensing circuitry.

Although not included in the system package 1, nor on the printed circuit board 13, the alarm circuitry of FIG. 7 is shown to indicate a typical alarm system that may be used with the sensor. When the sensor is triggered, the grounded output signal from the junction of transistor 131 and Zener diode 161 completes the coil circuit of the timer-relay 132, closing contacts 135. Positive voltage is then applied through the contacts to the audio frequency generator/amplifier/driver 134. This is coupled to speaker 133 to provide an audible system alarm. If the motion(s) which caused the sensor to be triggered cease to occur, the sensor system's output will be turned off. The relay 132 will stay activated for its preset time period and then open the contacts to turn off the audible alarm.

Now referring to FIG. 9, a modified form of bridge assembly is illustrated therein in which the columns 22 and 23 support both bridges 24 and 40A. In this case bridge 40A, corresponding to bridge 40 of FIG. 1, extends from column 22 to column 23. It is secured in recepter slots 47 and 48. This eliminates the need for the separate bridge 40 and the steps of fabricating its leg portions and securing them to the base 11.

Since the span of bridge 40A is much greater than the span of bridge 40, the dimensions and materials will be modified to provide the resonent frequency of 1000-2000 Hz, preferably in the 1750-1850 Hz range.

An important feature of the mechanical system of this invention is illustrated in FIGS. 10 and 11. In FIG. 10, the sensor has been tilted about its transverse axis as in the case of a vehicle parked on an incline. The Hall-effect device 50 on bridge 40 assumes the incline angle $\alpha$. The magnet 32 on the relatively flexible bridge 24 tips slightly but maintains a relatively stable relationship with the Hall-effect device 50. Afer initial instability during movement to the inclined postion, as in parking, the magnetic field stabilizes and if the system is then armed, it will be fully effective to detect further rapid incline movement or shock. This invention is operative upon a change in magnetic field strength on the Hall-effect device, not on its absolute level. Therefore this system will also operate if the sensor is mounted inverted as is shown in FIG. 11. Note in FIG. 11 that the spacing between the magnet 32 and Hall-effect device 50 is greater but the field strength relationship is stable until a stimulus is present.

Figure 12:
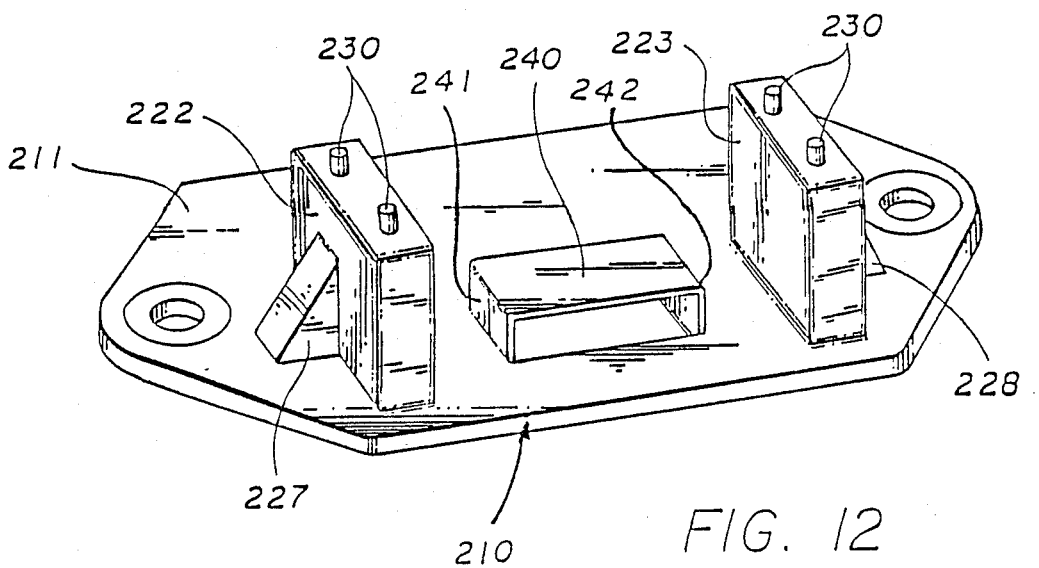
FIG. 12 is a perspective view of an integrally molded body support structure for use in this invention.

Since the basic suspension structure of this invention involves superimposed bridges, I have determined that it may be greatly simplified in design by employing a unitary molded plastic structure which provides the base, magnet bridge column, Hall-effect device bridge and securing means for the magnet bridge. Such a structure is illustrated in FIG. 12. There, a unitary molded body 210 is acetal resin, for example 37 Delrin" brand produced by Du Pont de Nemours, Inc. or acrylonitrile-butadiene-styrene ("ABS"), is formed with an integral bridge 240 to support the Hall-effect device, unshown, on its upper surface. The dimensions of the bridge 240 and legs 241 and 242 are correlated with the properties of the plastic material to produce the preferred resonant frequency for the application of the sensor. Since plastic materials have significantly different moduli of elasticity, the dimensions of the bridge 240 and its legs 241 and 242 will differ from the metal version of FIG. 1. Selection of materials and dimensioning plastic parts for elastic applications is well within the knowledge of skilled plastic molding designers.

Body 210 also includes columns 222 and 223 embracing the bridge 240 and extending above its level to locate the bridge 24 of FIG. 1. Integral rivets 230 may be thermally headed to hold the bridge 24 and plates 25 and 26 of FIG. 1 in place.

Because of the need to stiffen columns 222 and 223, integral buttresses 227 and 228 are provided. The structure of FIG. 12 results in a low cost effective assembly.

In carrying out this invention, the following components have been used to achieve a characteristic response curve of FIG. 8.

| | | |
|---|---|---|
| Bridge | 24 | Silicone rubber |
| | | 10 mm × 30 mm × 0.3 mm per attached specification |
| Magnet | 31 | Alnico V |
| Columns | 22, 32 | aluminum |
| Bridge | 40 | aluminum L 15 mm, W 5 mm, H 4 mm, thickness 0.1 mm |
| Hall-effect device | 50 | Type 0H003 |
| Op. Amp. | 120, 121 | Type VJM3404A |
| Comparator | 122, 123 | Type NJM 2403 |
| Transistors | 127, 128 | Type 2SA1034 |
| Transistor | 131 | Type 2DS874A |
| LED | 129 | Type GL3HD27 |
| Potentiometer | 136 | 30 K Ohms |
| Voltage Reg. | 137 | Type AN78L06 |
| Zener Diode | 161 | Type RD 33P |
| Diode | 162 | Type 10D1 |
| Resistor | 150 | 470 Ohms |
| Resistor | 140 | 10 K Ohms |
| Resistor | 142 | 56 K Ohms |
| Resistor | 143 | 2.2 Megohm |
| Resistor | 144 | 1 K Ohm |
| Resistor | 145 | 6.8 K Ohm |
| Resistor | 147 | 56 K Ohm |
| Resistor | 148 | 1.5 Megohm |
| Resistor | 151 | 47 K Ohm |
| Resistor | 152 | 47 K Ohm |
| Resistor | 153 | 22 K Ohm |
| Resistor | 154 | 15 K Ohm |
| Resistor | 155 | 22 K Ohm |
| Resistor | 158 | 150 K Ohm |
| Resistor | 124 | 3.3 K Ohm |
| Resistor | 126 | 330 K Ohm |
| Resistor | 159 | 10 K Ohm |
| Resistor | 130 | 1.8 K Ohm |
| Resistor | 160 | 1 K Ohm |
| Capacitor | 125 | 3.3 microfarad |
| Capacitor | 141 | 1.0 microfarad |
| Capacitor | 146 | 1.0 microfarad |
| Capacitor | 149 | 22 microfarad |
| Capacitor | 156 | 100 microfarad |
| Capacitor | 157 | 100 microfarad |

ELASTOMER SPECIFICATION

SILICONE RUBBER

KE 941U

| Typical properties | |
|---|---|
| Appearance | milky white |
| Specific gravity | 1.15 |
| Plasticity (Williams) | 210 |

Curing Condition

| | |
|---|---|
| KE 951-U | 100 |
| C-8 | 2 |
| Pre-Cure at 165 degrees C. for 10 minutes | |
| Post Cure at 200 degrees C. for 4 hours or 150 degrees C. for 22 hours | |
| Hardness, Shore A (Durometer) | 41 |
| Tensile Strength (Kg/cm$^2$) | 74 |
| Elongation (%) | 385 |
| Tear Resistance (Kgf/cm) | — |
| Resilience (%) | 75 |
| Compression Set (%) | 10 |

This invention shall not be limited to the illustrative embodiment but rather to the claims as set forth below which constitutes definitions of this invention including the protection afforded by the doctrine of equivalents.

What is claimed is:

1. A motion and shock detector comprising:

a magnetic field sensitive device for producing an electrical signal output responsive to a change in the ambient magnetic field level;

means for producing a local magnetic field;

means for mounting said magnetic filed producing means in a magnetic field producing means in a magnetic field producing relationship with said magnetic field sensitive device;

said means for mounting said magnetic field producing means having a preselected resonant frequency in the range of less than 2000 Hertz;

means for mounting said magnetic field sensitive device;

said means for mounting said magnetic field sensitive device having a preselected resonant frequency range different from the preselected resonant frequency of said means for mounting said means for producing a magnetic field whereby said magnetic field sensitive device produces an electrical signal output with enhanced output within either of two preselected frequency ranges.

2. A motion and shock detector in accordance with claim 1 wherein said magnetic field sensitive device comprises a Hall-effect device.

3. A motion and shock detector in accordance with claim 1 wherein said magnetic field producing means is a magnet.

4. A motion and shock detector in accordance with claim 3 in which said means for mounting said means for producing an magnetic field magnet has a resonant frequency less than 150 Hertz.

5. A motion and shock detector in accordance with claim 1 wherein said means for mounting said magnetic field sensitive device has a resonant frequency in the order of above 150 Hertz.

6. A motion and shock detector in accordance with claim 1 wherein said means for mounting said magnetic field producing means comprises a bridge suspending said magnetic field producing means in the region of said magnetic field sensitive device.

7. A motion and shock absorber detector in accordance with claim 6 in which said bridge includes a flexible strip having a mass significantly less than the mass of said magnetic field producing means.

8. A motion and shock detector in accordance with claim 1 in which said means for mounting said magnetic field sensitive device comprises a bridge, said bridge suspending said magnetic field sensitive device in the magnetic filed produced by said magnetic field producing means.

9. A motion and shock detector in accordance with claim 8 wherein said means mounting said magnetic field producing means comprises a bridge located within the said bridge mounting said magnetic field sensitive device.

10. A motion and shock detector in accordance with claim 1, 7, or 8 wherein said means for mounting said magnetic field sensitive device and said means for mounting said magnetic field producing means are supported by a common means.

11. A motion and shock detector system comprising a sensor and circuit means for generating an electrical signal responsive to low frequency motion stimuli or higher frequency stimuli to said sensor, said sensor comprising:

a first bridge;

a magnetic field producing device on said first bridge;

a second bridge;

a magnetic field sensitive device on said second bridge;

said first bridge and sid magnetic field producing device having a predetermined resonant frequency;

said second bridge and said magnetic field sensitive device having a predetermined resonant frequency different from the predetermined resonant frequency of said first bridge and said magnetic field producing device;

whereby said sensor responds to stimuli at two different resonant frequencies;

said magnetic field sensitive device producing an electrical signal responsive to said magnetic field;

said circuit means including means for blocking D.C. signals from said magnetic field sensitive device and for amplifying A.C. signals from said magnetic field sensitive device to produce output signals responsive to changes in the magnetic field at said magnetic field sensitive device.

12. A motion and shock detector in accordance with claim 11 wherein said magnetic field producing device is a magnet.

13. A motion and shock detector in accordance with claim 11 wherein said magnetic field sensitive device is a Hall-effect device.

14. A motion and shock detector in accordance with claim 11 wherein the resonant frequency of said first bridge and said magnetic field producing device is under 150 Hertz.

15. A motion and shock detector in accordance with claim 14 wherein the resonant frequency of said second bridge and said magnetic field producing device falls in the range of 15 to 40 Hertz.

16. A motion and shock detector in accordance with claim 11 wherein the resonant frequency of said second bridge and said magnetic field sensitive device fall in the range of 1000 to 2000 Hertz.

17. A motion and shock detector in accordance with claim 16 wherein the resonant frequency of sid second bridge and said magnetic field sensitive device fall in the range of 1750 to 1850 Hertz.

18. A motion and shock detector in accordance with claim 11 wherein said first bridge includes a relatively flexible elastomer supporting said magnetic field producing device and said elastomer is supported between a pair of relatively rigid columns.

19. A motion and shock detector system in accordance with claim 11 wherein said second bridge is of metal.

20. A motion and shock detector in accordance with claim 11 wherein said magnetic field producing device and said magnetic field sensitive device are located substantially at the center of their respective bridges.

21. A motion and shock detector in accordance with claim 20 wherein said magnetic field producing device and said magnetic field sensitive device are in juxtaposed spaced relationship.

22. In a motion and shock detector including a magnetic field producing device, a magnetic field sensitive device and bridge means for supporting said magnetic field producing device and said magnetic field sensitive device in spaced juxtaposed relationship, a support structure characterized in that it constitutes a unitary body including a base, an integral bridge spanning a portion of said base and a pair of columns for supporting a second bridge in spaced juxtaposition with respect to said integral bridge.

23. A support structure in accordance with claim 22 wherein said support structure is of molded plastic.

24. A motion and shock detector comprising:
a base;
a pair of spaced upstanding columns on said base;
a first bridge extending betwen said spaced upstanding columns;
a second bridge extending between said spaced upstanding columns;
said first bridge supporting a magnetic field producing device;
said second bridge supporting a magnetic field sensitive device capable of producing an electrical signal responsive to said magnetic filed;
said first bridge and magnetic field producing device having a predetermined resonant frequency;
said second bridge and magnetic field sensitive device having a resonant frequency different from the resonant frequency of said first bridge and magnetic field producing device;
whereby said sensor respond to stimuli in two different frequency ranges.

25. A motion and shock detector in accordance with claim 24 wherein said magnetic field producing device comprises a magnet.

26. A motion and shock detector in accordance with claim 24 wherein said magnetic field sensitive device comprises a Hall-effect device.

27. A motion and shock detector in accordance with claim 24 wherein said first bridge is fabricated of an elastomer.

28. A motion and shock detector in accordance with claim 24 wherein said second bridge is fabricated of metal.

29. A motion and shock detector in accordance with claim 24 wherein the resonant frequency of said first bridge and magnetic field producing device is under 150 Hertz.

30. A motion and shock detector in accordance with claim 29 wherein the resonant frequency of said first bridge and magnetic field producing device is in the range of 15 to 40 Hertz.

31. A motion and shock detector in accordance with claim 24 wherein the resonant frequency of said second bridge and magnetic field sensitive device falls in the range of 1000 to 2000 Hertz.

32. A motion and shock detector in accordance with claim 31 wherein the resonant frequency of said second bridge and magnetic field sensitive device falls in the range of 1850 Hertz.

* * * * *